(12) United States Patent
Backus et al.

(10) Patent No.: US 6,568,316 B1
(45) Date of Patent: May 27, 2003

(54) ROTISSERIE SPIT ATTACHMENT

(76) Inventors: Alan L. Backus, 1660 Bel Air Rd., Los Angeles, CA (US) 90077; Ron Popeil, 1672 Waynecrest Dr., Beverly Hills, CA (US) 90210

(*) Notice: Subject to any disclaimer, the term of this patent is extended or adjusted under 35 U.S.C. 154(b) by 0 days.

(21) Appl. No.: 10/021,406

(22) Filed: Dec. 5, 2001

(51) Int. Cl.[7] ................................. A47J 37/04
(52) U.S. Cl. ........................ 99/421 H; 99/421 HV; 99/419
(58) Field of Search .............. 99/421 H, 421 HH, 99/421 HV, 421 R, 419; 126/25 R, 9 R, 25 AA (56) References Cited

U.S. PATENT DOCUMENTS

| | | |
|---|---|---|
| 199,712 A | 1/1878 | Horrocks et al. |
| 251,657 A | 12/1881 | Van |
| 257,609 A | 5/1882 | Porter |
| 427,671 A | 5/1890 | Carpenter |
| 442,758 A | 12/1890 | Soden |
| 504,256 A | 8/1893 | Strong |
| 553,363 A | 1/1896 | Sickels |
| 559,720 A | 5/1896 | Lacroix |
| 693,725 A | 2/1902 | Leland |
| 714,430 A | 11/1902 | Worley et al. |
| 807,162 A | 12/1905 | Gardner |
| 848,018 A | 3/1907 | Engelhard |
| 904,382 A | 11/1908 | Van Patten |
| 961,543 A | 6/1910 | Sidgreaves |
| 1,045,049 A | 11/1912 | Longfellow et al. |
| 1,063,516 A | 6/1913 | Dunn et al. |
| 1,093,883 A | 4/1914 | Raillere |
| 1,584,121 A | 5/1926 | Moecker, Jr. et al. |
| 1,666,394 A | 4/1928 | Miglin |
| 1,723,704 A | 8/1929 | Morgan |
| 1,786,300 A | 12/1930 | Harrison |
| 1,976,989 A | 10/1934 | Grimes ............... 53/5 |
| 1,993,607 A | 3/1935 | Kalgren ............... 219/35 |
| 2,012,811 A | 8/1935 | Duffy ............... 126/41 |
| 2,048,769 A | 7/1936 | Anderson ............... 126/29 |
| 2,085,169 A | 6/1937 | Prood ............... 53/5 |
| 2,102,097 A | 12/1937 | Sherman ............... 53/5 |
| 2,130,259 A | 9/1938 | Bonaguidi ............... 53/5 |
| 2,133,667 A | 10/1938 | Mitchell ............... 17/44.2 |
| 2,136,658 A | 11/1938 | Westberg et al. ............... 53/5 |
| 2,142,390 A | 1/1939 | Zerr ............... 53/5 |
| 2,245,220 A | 6/1941 | Nelson ............... 219/35 |
| 2,297,825 A | 10/1942 | Bobo ............... 53/5 |
| 2,472,164 A | 6/1949 | Mannheimer ............... 126/25 |
| 2,501,104 A | 3/1950 | Smith ............... 99/449 |
| 2,502,685 A | 4/1950 | Warner ............... 99/421 |
| 2,607,286 A | 8/1952 | Krissel ............... 99/292 |
| 2,616,360 A | 11/1952 | Thompson ............... 99/426 |

(List continued on next page.)

FOREIGN PATENT DOCUMENTS

| | | |
|---|---|---|
| AT | 223335 | 9/1962 |
| AT | 238395 | 6/1964 |
| CH | 424144 | 5/1967 |

(List continued on next page.)

OTHER PUBLICATIONS

Farberware Millennium Use & Care Instructions Vertical Rotisserie FSR150; Dated Apr. 1998; (11) Pages.

Hankin, et al., *Advantage Partners, LLC v. Salton, Inc., et al.* "Defendants' Opposition to Plaintiff's Ex Parte Application for Temporary Restraining Order and Order to Show Cause Re Preliminary Injunction"; Dated Jul. 16, 2001; (36) Pages.

(List continued on next page.)

*Primary Examiner*—Reginald L. Alexander (57) ABSTRACT

An improved spit assembly which may be fitted on a variety barbeques. A preferred embodiment uses twin parallel horizontal spit rods to hold food and food supporting accessories. An adjustable bearing adapts to various barbeque widths. Cavity shaped receptacles with hand tightened set screws make assembly and disassembly of the spit simpler and improve space efficiency for storage, shipment or other purposes.

27 Claims, 6 Drawing Sheets

U.S. PATENT DOCUMENTS

| | | |
|---|---|---|
| 2,618,730 A | 11/1952 | Panken .......... 219/35 |
| 2,619,951 A | 12/1952 | Kahn .......... 126/25 |
| 2,638,841 A | 5/1953 | Boyce .......... 99/397 |
| 2,649,852 A | 8/1953 | McCandless .......... 126/273 |
| 2,681,001 A | 6/1954 | Smith .......... 99/402 |
| 2,696,163 A | 12/1954 | Galley .......... 99/427 |
| 2,701,516 A | 2/1955 | Dorsey .......... 99/346 |
| 2,705,450 A | 4/1955 | Steinbook .......... 99/238.1 |
| 2,722,882 A | 11/1955 | Wilson .......... 99/421 |
| 2,727,315 A | 12/1955 | Candor .......... 34/45 |
| 2,759,411 A | 8/1956 | Jenson .......... 98/40 |
| 2,760,428 A | 8/1956 | Boyajian .......... 99/427 |
| 2,762,293 A | 9/1956 | Boyajian .......... 99/421 |
| 2,809,579 A | 10/1957 | Theisen .......... 99/339 |
| 2,811,099 A | 10/1957 | McGoldrick .......... 99/444 |
| 2,815,707 A | 12/1957 | Morrow .......... 99/421 |
| 2,821,187 A | 1/1958 | Tescula .......... 126/25 |
| 2,827,847 A | 3/1958 | Shafter .......... 99/394 |
| 2,828,733 A | 4/1958 | Moore, Jr. .......... 126/25 |
| 2,831,420 A | 4/1958 | Radman .......... 99/357 |
| 2,831,421 A | 4/1958 | Mele .......... 99/421 |
| 2,839,989 A | 6/1958 | Persinger .......... 99/421 |
| 2,846,941 A | 8/1958 | Goodwin .......... 99/340 |
| 2,851,575 A | 9/1958 | Walston et al. .......... 219/35 |
| 2,867,163 A | 1/1959 | Bloom .......... 99/386 |
| 2,882,812 A | 4/1959 | Greenwald .......... 99/427 |
| 2,885,950 A | 5/1959 | Stoll et al. .......... 99/340 |
| 2,887,944 A | 5/1959 | Walker .......... 99/421 |
| 2,888,872 A | 6/1959 | Bathe .......... 99/259 |
| 2,895,408 A | 7/1959 | Glenny .......... 99/427 |
| 2,898,437 A | 8/1959 | McFarland .......... 219/35 |
| 2,925,081 A | 2/1960 | Shooter .......... 126/190 |
| 2,938,450 A | 5/1960 | Carpenter et al. .......... 99/427 |
| 2,939,383 A | 6/1960 | Kanaga .......... 99/327 |
| 2,940,380 A | 6/1960 | Rampel .......... 99/346 |
| 2,979,053 A | 4/1961 | Crispell et al. .......... 126/194 |
| 2,983,218 A | 5/1961 | Persinger et al. .......... 99/427 |
| 3,025,783 A | 3/1962 | Coudek .......... 99/345 |
| 3,045,581 A | 7/1962 | Bernstein .......... 99/340 |
| 3,070,953 A | 1/1963 | Carrel .......... 60/23 |
| 3,074,360 A | 1/1963 | Vaughan .......... 107/59 |
| 3,079,208 A | 2/1963 | Compton .......... 312/315 |
| 3,085,500 A | 4/1963 | Russell .......... 99/427 |
| 3,100,435 A | 8/1963 | Mobley, Jr. .......... 99/421 |
| 3,103,161 A | 9/1963 | Whitehead .......... 99/427 |
| 3,104,605 A | 9/1963 | McKinney .......... 99/421 |
| 3,121,424 A | 2/1964 | Russell .......... 126/25 |
| 3,125,015 A | 3/1964 | Schlaegel .......... 99/421 |
| 3,126,814 A | 3/1964 | Brown .......... 99/421 |
| 3,127,889 A | 4/1964 | Mills .......... 126/194 |
| 3,129,653 A | 4/1964 | Kertesz .......... 99/421 |
| D199,712 S | 12/1964 | Elliott .......... D81/10 |
| 3,181,453 A | 5/1965 | Moran .......... 99/349 |
| 3,182,585 A | 5/1965 | Rensch et al. .......... 99/340 |
| 3,188,939 A | 6/1965 | Smith .......... 99/393 |
| 3,196,776 A | 7/1965 | Norton .......... 99/421 |
| 3,205,812 A | 9/1965 | Booth .......... 99/421 |
| 3,240,147 A | 3/1966 | Farber et al. .......... 99/421 |
| 3,248,518 A | 4/1966 | Ogle, Jr. et al. .......... 219/447 |
| 3,269,299 A | 8/1966 | Nielsen .......... 99/421 |
| 3,276,351 A | 10/1966 | Sundholm .......... 99/339 |
| 3,285,238 A | 11/1966 | Norlie |
| 3,315,591 A | 4/1967 | Elliott .......... 99/421 |
| 3,329,082 A | 7/1967 | Satkunas .......... 99/421 |
| 3,333,529 A | 8/1967 | Wilson .......... 99/339 |
| 3,335,712 A | 8/1967 | Marasco .......... 126/25 |
| 3,348,471 A | 10/1967 | Lackenbauer et al. |
| 3,355,573 A | 11/1967 | Wilson .......... 219/396 |
| 3,362,320 A | 1/1968 | Marasco .......... 99/443 |
| 3,473,464 A | 10/1969 | Lasker .......... 99/421 |
| 3,503,323 A | 3/1970 | Swetlitz .......... 99/352 |
| 3,511,170 A | 5/1970 | O'Connor .......... 99/402 |
| 3,527,155 A | 9/1970 | Renn .......... 99/421 |
| 3,529,536 A | 9/1970 | Milhem .......... 99/346 |
| 3,559,565 A | 2/1971 | Getz .......... 99/340 |
| 3,566,777 A | 3/1971 | Koziol .......... 99/427 |
| 3,693,538 A | 9/1972 | Synder .......... 99/447 |
| 3,734,740 A | 5/1973 | Zenos |
| 3,782,268 A | 1/1974 | Navarro .......... 99/421 P |
| 3,797,379 A | 3/1974 | Brion .......... 99/421 H |
| 3,802,331 A | 4/1974 | Zickefoose .......... 99/427 |
| 3,805,762 A | 4/1974 | Nelson .......... 126/4 |
| 3,807,292 A | 4/1974 | Cinger .......... 99/348 |
| 3,838,538 A | 10/1974 | Burford .......... 49/258 |
| 3,848,522 A | 11/1974 | Trelc .......... 99/421 H |
| 3,867,605 A | 2/1975 | Yee .......... 219/10.55 D |
| 3,867,877 A | 2/1975 | Zajc .......... 99/402 |
| 3,901,136 A | 8/1975 | Wilson et al. .......... 99/352 |
| 3,931,758 A | 1/1976 | Blake .......... 99/419 |
| 3,935,806 A | 2/1976 | Connolly .......... 99/340 |
| 3,935,807 A | 2/1976 | Main et al. .......... 99/352 |
| 3,939,761 A | 2/1976 | McGinty .......... 99/421 H |
| 3,943,837 A | 3/1976 | Trkla .......... 99/339 |
| 3,959,620 A | 5/1976 | Stephen, Jr. .......... 219/386 |
| 3,980,010 A | 9/1976 | Collinucci .......... 99/421 H |
| 4,005,646 A | 2/1977 | Krüper .......... 99/427 |
| 4,051,838 A | 10/1977 | Pinckney .......... 126/340 |
| 4,089,258 A | 5/1978 | Berger .......... 99/339 |
| 4,103,605 A | 8/1978 | Hemborg et al. .......... 99/345 |
| 4,103,606 A | 8/1978 | Gitcho .......... 99/443 C |
| 4,106,473 A | 8/1978 | Wandel .......... 126/25 R |
| 4,114,523 A | 9/1978 | Eff .......... 99/393 |
| 4,119,020 A | 10/1978 | Sharp et al. .......... 99/339 |
| 4,154,154 A | 5/1979 | Vivian .......... 99/421 HH |
| 4,158,992 A | 6/1979 | Malafouris .......... 99/421 HV |
| 4,163,894 A | 8/1979 | Scherer .......... 219/391 |
| 4,165,683 A | 8/1979 | Van Gilst .......... 99/393 |
| 4,176,592 A | 12/1979 | Doyle, Jr. .......... 99/419 |
| 4,181,074 A | 1/1980 | Hieb .......... 99/421 HH |
| 4,214,516 A | 7/1980 | Friedl et al. .......... 99/421 P |
| 4,244,979 A | 1/1981 | Roderick .......... 426/418 |
| 4,270,444 A | 6/1981 | Geissmann .......... 99/421 V |
| 4,286,133 A | 8/1981 | Einset et al. .......... 219/10.55 F |
| 4,300,443 A | 11/1981 | Morcos et al. .......... 99/332 |
| 4,301,718 A | 11/1981 | Lewinger et al. .......... 99/359 |
| 4,304,177 A | 12/1981 | Loeffler et al. .......... 99/333 |
| 4,321,857 A | 3/1982 | Best .......... 99/340 |
| 4,327,274 A | 4/1982 | White et al. .......... 219/10.55 R |
| 4,335,289 A | 6/1982 | Smith .......... 219/10.55 F |
| 4,355,569 A | 10/1982 | Sage .......... 99/427 |
| 4,355,626 A | 10/1982 | Bailey et al. |
| 4,366,750 A | 1/1983 | Brown et al. .......... 99/421 V |
| 4,372,199 A | 2/1983 | Brown et al. .......... 99/341 |
| 4,407,189 A | 10/1983 | Bentson .......... 99/421 HH |
| 4,409,452 A | 10/1983 | Oouchi et al. .......... 219/10.55 E |
| 4,410,553 A | 10/1983 | McGinty .......... 426/243 |
| 4,418,261 A | 11/1983 | Jailor et al. .......... 219/10.55 R |
| 4,421,016 A | 12/1983 | Sich .......... 99/402 |
| 4,442,763 A | 4/1984 | Beller .......... 99/427 |
| 4,450,758 A | 5/1984 | Belinkoff et al. .......... 99/332 |
| 4,454,805 A | 6/1984 | Matthews .......... 99/400 |
| 4,455,928 A | 6/1984 | Townsend .......... 99/533 |
| 4,470,343 A | 9/1984 | Didier .......... 99/427 |
| 4,483,241 A | 11/1984 | Vaughn .......... 99/421 H |
| 4,491,065 A | 1/1985 | Poulson .......... 99/327 |
| 4,505,195 A | 3/1985 | Waltman .......... 99/427 |
| 4,508,024 A | 4/1985 | Perkins .......... 99/340 |
| 4,520,791 A | 6/1985 | Chamberlain |
| 4,548,130 A | 10/1985 | Diener et al. .......... 99/345 |
| 4,555,986 A | 12/1985 | Eisenberg .......... 99/427 |
| 4,556,046 A | 12/1985 | Riffel et al. .......... 126/299 D |

| Patent No. | Date | Inventor | Class |
|---|---|---|---|
| 4,562,771 A | 1/1986 | Williams | 99/397 |
| 4,572,062 A | 2/1986 | Widdowson | 99/345 |
| 4,583,452 A | 4/1986 | Grosse | 99/427 |
| 4,585,661 A | 4/1986 | Brummett | 426/520 |
| 4,591,683 A | 5/1986 | Eke | 219/10.55 B |
| 4,600,254 A | 7/1986 | Whalen | |
| 4,625,634 A | 12/1986 | Krüper | 99/427 |
| 4,661,669 A | 4/1987 | Matsushima et al. | |
| 4,688,541 A | 8/1987 | Stephen et al. | 126/25 R |
| 4,726,352 A | 2/1988 | Radke | 126/190 |
| 4,743,737 A | 5/1988 | Tateishi | 219/368 |
| 4,817,514 A | 4/1989 | Hitch et al. | 99/419 |
| 4,839,186 A | 6/1989 | Boyle | 426/523 |
| 4,867,051 A | 9/1989 | Schalk | 99/443 C |
| 4,870,896 A | 10/1989 | Asahina et al. | 99/348 |
| 4,886,044 A | 12/1989 | Best | 126/39 C |
| 4,924,766 A | 5/1990 | Hitch | |
| 4,968,515 A | 11/1990 | Burkett et al. | |
| 4,986,174 A | 1/1991 | Gongwer | 99/345 |
| 5,001,971 A | 3/1991 | Beller | |
| 5,038,748 A | 8/1991 | Lockwood et al. | 126/19 R |
| 5,039,535 A | 8/1991 | Lang et al. | |
| 5,058,493 A | 10/1991 | Basek et al. | 99/339 |
| 5,134,927 A | 8/1992 | McCarthy, III. et al. | 99/427 |
| 5,136,933 A | 8/1992 | Derakhshan | 99/421 P |
| 5,146,842 A | 9/1992 | Romano | 99/421 V |
| 5,148,737 A | 9/1992 | Poulson | 99/327 |
| 5,163,358 A | 11/1992 | Hanagan et al. | 99/339 |
| 5,172,628 A | 12/1992 | Pillsbury et al. | 99/421 H |
| 5,182,981 A | 2/1993 | Wilcox | 99/333 |
| 5,184,540 A | 2/1993 | Riccio | 99/421 H |
| 5,193,444 A | 3/1993 | Bar-Sheshet | 99/427 |
| 5,205,207 A | 4/1993 | McGuire | 99/340 |
| 5,205,208 A | 4/1993 | Gongwer | 99/345 |
| 5,235,148 A | 8/1993 | Yamaguchi et al. | 219/10.55 B |
| 5,235,903 A | 8/1993 | Tippmann | 99/331 |
| 5,275,095 A | 1/1994 | Van Haren | 99/533 |
| 5,297,534 A | 3/1994 | Louden | 126/30 |
| D347,762 S | 6/1994 | Bannigan | D7/328 |
| 5,325,767 A | 7/1994 | Beller | 99/421 R |
| 5,361,685 A | 11/1994 | Riccio | 99/421 H |
| 5,361,686 A | 11/1994 | Koopman | 99/421 H |
| 5,367,950 A | 11/1994 | Sarich | 99/421 H |
| 5,373,778 A | 12/1994 | Moreth | 99/421 H |
| 5,373,809 A | 12/1994 | Sphar | 119/17 |
| 5,379,685 A | 1/1995 | Krasznai | 99/389 |
| 5,390,588 A | 2/1995 | Krasznai et al. | 99/389 |
| 5,404,795 A | 4/1995 | Coble | 99/339 |
| 5,405,627 A | 4/1995 | Ito | |
| 5,410,948 A | 5/1995 | Eickmeyer | 99/335 |
| 5,410,950 A | 5/1995 | Rone | 99/421 HV |
| 5,417,148 A | 5/1995 | Cavallo | 99/334 |
| 5,427,015 A | 6/1995 | Zittel | 99/348 |
| 5,429,042 A | 7/1995 | Koopman | |
| 5,431,093 A | 7/1995 | Dodgen | 99/427 |
| 5,441,037 A | 8/1995 | Yen | 126/258 |
| 5,442,999 A | 8/1995 | Meister | 99/426 |
| 5,445,064 A | 8/1995 | Lopata | 99/421 H |
| 5,445,065 A | 8/1995 | Lopata | 99/421 H |
| 5,447,096 A | 9/1995 | Bürge et al. | 99/339 |
| 5,447,620 A | 9/1995 | Pagnac et al. | 208/33 |
| 5,451,744 A | 9/1995 | Koopman et al. | 219/400 |
| 5,465,653 A | 11/1995 | Riccio | 99/421 H |
| 5,469,782 A | 11/1995 | Wong | 99/644 |
| 5,471,914 A | 12/1995 | Krasznai et al. | 99/389 |
| 5,471,915 A | 12/1995 | Lopata | 99/421 H |
| 5,473,977 A | 12/1995 | Koether et al. | 99/421 P |
| 5,485,780 A | 1/1996 | Koether et al. | 99/419 |
| 5,497,697 A | 3/1996 | Promny | 99/427 |
| 5,515,774 A | 5/1996 | Swisher et al. | 99/340 |
| 5,518,127 A | 5/1996 | Warmack et al. | 211/193 |
| 5,533,440 A | 7/1996 | Sher | 99/421 HH |
| 5,545,874 A | 8/1996 | Hansson | 219/400 |
| 5,560,285 A | 10/1996 | Moreth | 99/421 H |
| 5,562,022 A | 10/1996 | Schmid et al. | 99/421 H |
| 5,566,997 A | 10/1996 | Lin | 294/5 |
| 5,575,196 A | 11/1996 | Masel et al. | 99/421 V |
| 5,579,681 A | 12/1996 | Ubert et al. | 99/427 |
| 5,588,353 A | 12/1996 | Glucksman et al. | 99/348 |
| 5,592,869 A | 1/1997 | Zittel | 99/348 |
| 5,598,582 A | 2/1997 | Andrews et al. | |
| 5,598,769 A | 2/1997 | Luebke et al. | 99/395 |
| 5,601,070 A | 2/1997 | Hotard et al. | 126/21 A |
| 5,611,265 A | 3/1997 | Ronci et al. | 99/353 |
| 5,619,909 A | 4/1997 | Volk | 99/419 |
| 5,632,098 A | 5/1997 | Finch | |
| 5,632,265 A | 5/1997 | Koziol | 126/30 |
| 5,639,497 A | 6/1997 | Bedford et al. | 426/233 |
| 5,665,258 A | 9/1997 | Hsu | 219/388 |
| 5,669,290 A | 9/1997 | Natsumi et al. | 99/421 H |
| 5,671,659 A | 9/1997 | Swindle | 99/419 |
| 5,697,289 A | 12/1997 | Hackett | 99/339 |
| 5,715,744 A | 2/1998 | Coutant | 99/421 H |
| 5,716,657 A | 2/1998 | Liebermann | 426/232 |
| 5,720,217 A | 2/1998 | Pappas | 99/421 H |
| D391,799 S | 3/1998 | Haring et al. | D7/338 |
| 5,727,719 A | 3/1998 | Veliz et al. | 224/148.4 |
| 5,735,191 A | 4/1998 | Russell et al. | 99/339 |
| 5,740,722 A | 4/1998 | Emsens | 99/419 |
| 5,740,724 A | 4/1998 | Fabrikant et al. | 99/426 |
| 5,746,116 A | 5/1998 | Smith | |
| 5,761,991 A | 6/1998 | Kambies | 99/427 |
| D395,980 S | 7/1998 | Boisselier | D7/354 |
| 5,778,766 A | 7/1998 | Wang | 99/326 |
| 5,780,815 A | 7/1998 | Mestnik et al. | 219/400 |
| 5,785,046 A | 7/1998 | Colla | 126/9 R |
| 5,793,610 A | 8/1998 | Schmitt et al. | 361/695 |
| 5,798,505 A | 8/1998 | Lee | 219/681 |
| 5,799,569 A | 9/1998 | Moreth | 99/421 H |
| 5,801,357 A | 9/1998 | Danen | 219/403 |
| 5,801,362 A | 9/1998 | Pearlman et al. | 219/400 |
| 5,802,962 A | 9/1998 | Goldyn | 99/421 H |
| 5,809,995 A | 9/1998 | Kobayashi et al. | 126/391 |
| 5,819,639 A | 10/1998 | Spell | 99/421 H |
| 5,845,563 A | 12/1998 | Haring et al. | 99/419 |
| 5,881,640 A | 3/1999 | Rævsager | 99/533 |
| 5,887,513 A | 3/1999 | Fielding et al. | 99/421 A |
| 5,910,332 A | 6/1999 | Fakieh | 426/523 |
| 5,918,534 A | 7/1999 | Medina | 99/342 |
| 5,970,854 A | 10/1999 | Tsai | 99/421 H |
| D415,923 S | 11/1999 | Hermansson | D7/323 |
| 5,974,956 A | 11/1999 | McConnell | 99/421 H |
| 5,981,926 A | 11/1999 | Kim | 219/732 |
| 5,997,928 A | 12/1999 | Kaish et al. | 426/418 |
| 6,009,797 A | 1/2000 | Lin | 99/421 H |
| 6,023,049 A | 2/2000 | Huang | |
| 6,038,965 A | 3/2000 | Thorndyke | 99/340 |
| 6,041,694 A | 3/2000 | Hsu | 99/427 |
| D422,172 S | 4/2000 | Hsu | D7/350 |
| 6,047,633 A | 4/2000 | Khaytman | 99/421 V |
| 6,076,453 A | 6/2000 | Hsu | 99/421 H |
| 6,079,319 A | 6/2000 | Doria | 99/331 |
| 6,079,322 A | 6/2000 | Su | 99/421 H |
| 6,085,642 A | 7/2000 | Terry | 99/421 A |
| 6,119,586 A | 9/2000 | Gongwer | 99/345 |
| 6,138,553 A | 10/2000 | Toebben | 99/421 H |
| D433,867 S | 11/2000 | Hsu | D7/350 |
| 6,142,064 A | 11/2000 | Backus et al. | 99/421 H |
| D434,939 S | 12/2000 | To | D7/350 |
| 6,167,800 B1 | 1/2001 | Su | 99/421 H |
| 6,170,390 B1 | 1/2001 | Backus et al. | |
| 6,173,645 B1 | 1/2001 | Backus et al. | 99/427 |

| | | | | |
|---|---|---|---|---|
| 6,178,879 B1 | 1/2001 | Park | | 99/421 H |
| 6,182,560 B1 | 2/2001 | Andress | | 99/400 |
| 6,240,838 B1 | 6/2001 | Backus et al. | | 99/421 H |
| 6,250,211 B1 | 6/2001 | Gongwer | | 99/340 |
| 6,250,214 B1 | 6/2001 | Backus et al. | | 99/419 |
| 6,253,665 B1 | 7/2001 | Backus et al. | | 99/421 H |
| 6,257,128 B1 | 7/2001 | Chen | | 99/421 H |
| 6,279,165 B1 | 8/2001 | Kobayashi | | |
| 6,330,855 B2 | 12/2001 | Backus et al. | | 99/447 |

FOREIGN PATENT DOCUMENTS

| | | | |
|---|---|---|---|
| CH | 603130 A5 | 8/1978 | |
| CH | 662496 A5 | 10/1987 | |
| DE | 657089 | 2/1938 | |
| DE | 1162985 | 2/1964 | |
| DE | 43251 | 11/1965 | |
| DE | 1998600 | 12/1968 | |
| DE | 1429829 | 4/1969 | |
| DE | 1454157 | 8/1969 | |
| DE | 1454014 | 7/1970 | |
| DE | 7047203 | 4/1971 | |
| DE | 1779063 | 10/1971 | |
| DE | 7213693 | 8/1972 | |
| DE | 2307575 | 8/1973 | |
| DE | 2358119 | 5/1974 | |
| DE | 7407464 | 7/1974 | |
| DE | 2308779 | 9/1974 | |
| DE | 2310390 | 9/1974 | |
| DE | 2425346 A1 | 12/1975 | |
| DE | 2430233 A1 | 1/1976 | |
| DE | 2205703 | 7/1976 | |
| DE | 1679001 | 8/1976 | |
| DE | 2646811 A1 | 4/1978 | |
| DE | 3000653 A1 | 7/1981 | |
| DE | 3214818 A1 | 11/1983 | |
| DE | 3401002 A1 | 7/1985 | |
| DE | 4112325 | 1/1992 | |
| DE | 4226098 A1 | 4/1993 | |
| DE | 4413050 C1 | 6/1995 | |
| DE | 29602405 U1 | 6/1996 | |
| DE | 2601877 A1 | 7/1997 | |
| DE | 29909108 U1 | 9/1999 | |
| DE | 29916161 U1 | 2/2000 | |
| DE | 29916242 U1 | 2/2000 | |
| EP | 0281866 | 9/1988 | |
| EP | 0332505 | 9/1989 | |
| EP | 0396470 A1 | 11/1990 | |
| ES | 2029576 | 8/1992 | |
| FR | 853400 | 4/1940 | |
| FR | 853400 | 1/1947 | |
| FR | 1116586 | 5/1956 | |
| FR | 1218203 | 5/1960 | |
| FR | 1265159 | 5/1961 | |
| FR | 1300126 | 6/1962 | |
| FR | 2078609 | 11/1971 | |
| FR | 2276799 A1 | 1/1976 | |
| FR | 2477396 A1 | 9/1981 | |
| FR | 2498915 A1 | 8/1982 | |
| FR | 2603178 A3 | 3/1988 | |
| FR | 2625668 | 7/1989 | |
| GB | 478044 | 1/1938 | |
| GB | 850083 | 9/1960 | |
| GB | 880899 | 10/1961 | |
| GB | 996233 | 6/1965 | |
| GB | 1257945 | 12/1971 | |
| IT | 555893 | 1/1957 | |
| JP | 60-49785 A | 3/1985 | |
| JP | 61-22133 | 1/1986 | |
| SE | 323756 | 5/1970 | |
| SE | 500872 C2 | 9/1994 | |
| WO | WO 86/04978 | 8/1986 | |
| WO | WO 00/28869 | 5/2000 | |

OTHER PUBLICATIONS

Wytsma, et al., *Advantage Partners, LLC v. Salton, Inc., et al.* "Defendants' Amended Opposition to Plaintiff's Ex Parte Application for Temporary Restraining Order and Order to Show Cause Re Preliminary Injunction"; Dated Aug. 1, 2001; (30) Pages.

Wytsma, et al., *Advantage Partners, LLC v. Salton, Inc., et al.* "Supplemental Opposition to Plaintiff's Ex Parte Application for Temporary Restraining Order and Order to Show Cause Re Preliminary Injunction"; Dated Aug. 1, 2001; (23) Pages.

Hatter, Jr., *Advantage Partners, LLC v. Salton, Inc., et al.* "Temporary Restraining Order"; Dated Aug. 13, 2001; (3) Pages.

Wytsma, et al., *Advantage Partners, LLC v. Salton, Inc., et al.* "Defendants' Opposition to Plaintiff Advantage Partners' Request for Preliminary Injunctive Relief"; Dated Aug. 17, 2001; (26) Pages.

Dorman, et al., *Advantage Partners, LLC v. Salton, Inc., et al.* "Reply Brief in Support of Plaintiff's Application for Preliminary Injunction"; Dated Aug. 22, 2001; (26) Pages.

Dorman, et al., *Advantage Partners, LLC v. Salton, Inc., et al.* "Memorandum of Points and Authorities in Support of Motion for Preliminary Injunction Against Defendant Salton, Inc. for Infringement of the '390 Patent"; Dated Oct. 22, 2001; (31) Pages.

Sigale, et al., *Advantage Partners, LLC v. Salton, Inc., et al.* "Defendant Salton, Inc.'s Opposition to Plaintiff Advantage Partners LLC's Motion for Preliminary Injunction"; Dated Oct. 29, 2001; (33) Pages.

Dorman, et al., *Advantage Partners, LLC v. Salton, Inc., et al.* "Ex Parte Application For Temporary Restraining Order and Order to Show Cause Re Preliminary Injunction", Dated Feb. 2, 2001; (6) Pages.

Hankin, et al. *Advantage Partners, LLC v. Salton, Inc., et al.* "Defendant Salton, Inc.'s Opposition to Plaintiff's Ex Parte Application For Temporary Restraining Order and Order to Show Cause Re Preliminary Injunction", Dated Feb. 6, 2001; (18) Pages.

Dorman, et al., *Advantage Partners, LLC v. Salton, Inc., et al.* "Plaintiff's Reply to Salton's Opposition to Ex Parte Application for Temporary Restraining Order and Order to Show Cause Re Preliminary Injunction", Dated Feb. 7, 2001; (29) Pages.

Dorman, et al., *Advantage Partners, LLC v. Salton, Inc., et al.* "Ex Parte Order Granting Application for Temporary Restraining Order and Order to Show Cause Re Preliminary Injunction"; Dated Feb. 9, 2001; (5) Pages.

Dorman, et al., *Advantage Partners, LLC v. Salton, Inc., et al.* "Final Consent Judgement and Permanent Injunction Against Defendant Salton, Inc."; Dated Feb. 20, 2001; (9) Pages.

ROTISSERIE SPIT ATTACHMENT

FIELD OF INVENTION

The present inventions relate to food supporting rotisserie spits that are, or may be, attached to barbeques.

BACKGROUND OF THE INVENTION

Devices to rotisserie cook foods on barbeque cookers are plentiful. As examples; devices illustrated on U.S. Pat. No. 5,801,357, Danen; U.S. Pat. No. 5,649,475, Murphy; U.S. Pat. No. 5,333,540, Mazzocchi; U.S. Pat. No. 5,195,425, Koziol; U.S. Pat. No. 4,924,766, Hitch; U.S. Pat. No. 4,598,690, Hsu; U.S. Pat. No. 3,733,999, Bernstein; and U.S. Pat. No. 3,247,827, Cremer; show several embodiments of such devices. Each of these patents illustrates the use of single spit rods, several with food supporting forks clamped on the single rods.

In addition, the inventors in this application introduced, in U.S. Pat. No. 6,173,645, a simplified spit assembly which eliminated the need for the old style food supporting forks used in the above devices, and replaced the forks with twin parallel horizontal spit rods which attached to and extended from a first round support plate to a second round support plate where they attached by the rods inserting their sharpened food piercing ends into tubular receptacles attached to the second round support plate.

Since this introduction, several imitators, on later application dates, have patented details of similar spit designs including Lin in U.S. Pat. No. 6,009,797, and Tsai in U.S. Pat. No. 5,970,854.

However, all the above art, alone or in combination has not taught a practical embodiment of an improved horizontal twin spit rod which may be attached to a variety of different barbeques. Nor has the above art taught modifications which might better the functionality of such an improved rotisserie attachment.

DESCRIPTION OF A PREFERRED EMBODIMENT

As shown in FIGS. 1 to 6, a first preferred embodiment of the present inventions includes: spit assembly 20, supported and mounted to barbeque 24 on a first end by mounting bracket 28, and powered, supported, and mounted to barbeque 24 on an end opposite the first end by motor drive 22 which is supported by mounting bracket 26.

Figure 5:
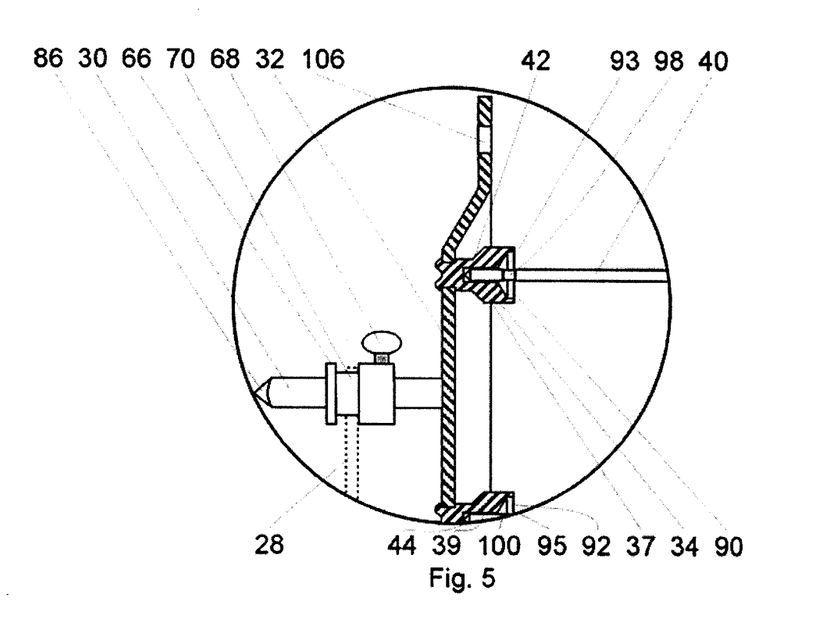
FIG. 5 is an enlargement of a portion of FIG. 3 as indicated in FIG. 3.

Spit assembly 20 comprises: first central axle 30 connected at general right angles to the back center of first support plate 32, which in turn mounts first and second spit tip receptacles 34 and 36, which in turn accept within first and second tubular detents 37 and 39 and couple at generally right angles to support plate 32, cylindrical ends 42 44 of first and second spit rods 38 and 40 (see FIG. 5). No set screws, screw threads, bayonet connectors or other securing devices are used in this connection, only friction created by the overlap (see FIGS. 5 and 6). This greatly simplifies the use of spit assembly 20 making food mounting and dismounting a simpler process than if ancillary securing devices were used.

Spit rods 38 and 40; on their opposite ends 46 and 48 (FIG. 6) mount at right angles to second support plate 50 through third and fourth receptacles 52 and 54. Here, ends 46 and 48 are secured by first and second set screws 56 and 58 within third and fourth tubular detents 60 and 62 of third and fourth receptacle 52 and 54 (see FIG. 6).

Figure 6:
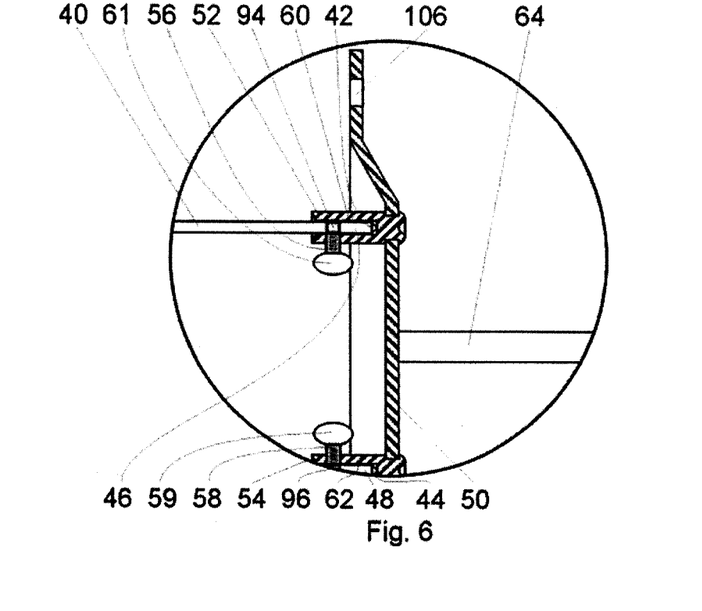
FIG. 6 is an enlargement of a portion of FIG. 3 as indicated in FIG. 3.

This, in combination with finger grips 59 and 61, allows first and second spit rods 38 and 40 to be easily detached by hand from second support plate 50 without use of tools. This may be a substantial advantage for shipping, storage or other purposes, especially considering the space inefficient shape of the twin spit rod design when not disassembled.

Support plate 50 has a frustum conical detent centrally located. Set screws 56 and 58 face inward to the center of support plate 50 with finger grips 59 and 61 within the frustum conical detent in support plate 50, thus making the finger grips easier to grasp and turn.

As an alternative, set screws 56 and 58 may employ Allen head, Phillips head or other type of tool requiring tightening heads. These would semi-permanently secure spit rods 38 and 40 in third and fourth receptacles 52 and 54.

Figure 4:
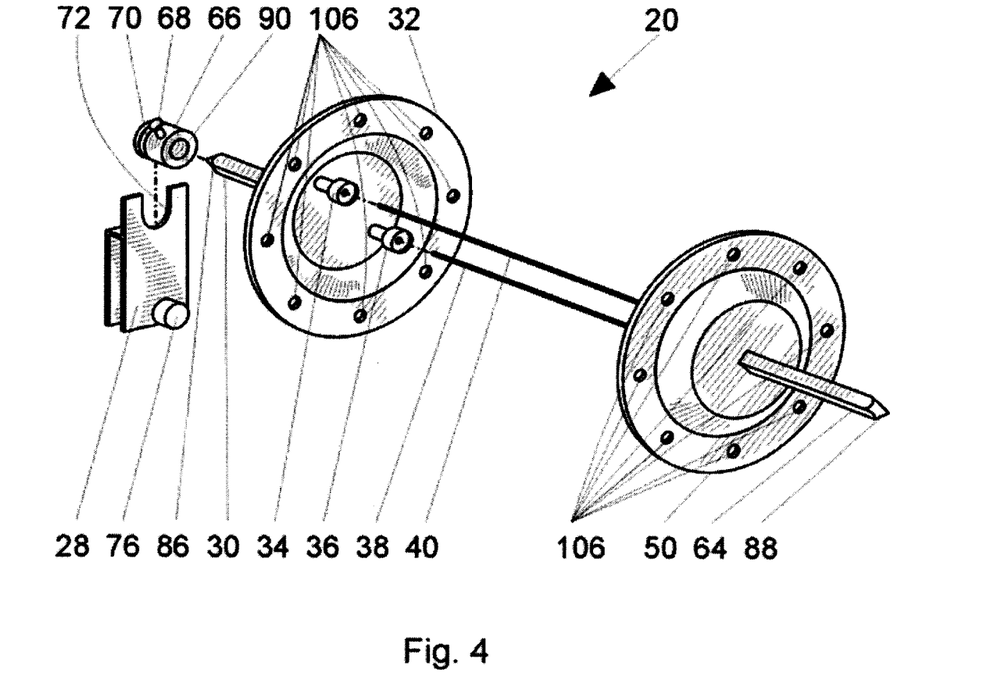
FIG. 4 is an exploded perspective view of the preferred embodiment shown in FIG. 1.

Mounting centrally to the opposite face of second support plate 50 from third and fourth receptacles 52 and 54 is axle 64 (see FIG. 6). Bearing 66 mounts to either axle 30 or axle 64 using third set screw 68 to hold it in place. As illustrated in FIG. 4, slot 70 in bearing 66 engages U shaped notch 72 in the top of mounting bracket 28 and thus supports one end of spit assembly 20.

The opposite end of spit assembly 20 is supported by either axle 30 or axle 64, whichever is not mounting bearing 66, and engages rotary driven drive socket 73 located on the inside face of motor drive 22. Axles 30 and 64 may be square, hexagonal, octagonal or other shape in cross section to engage and accept support and rotary drive from rotary driven drive socket 73 which should have a reciprocal negative detent to the cross sections of axles 30 and 40 to overlap, engage and provide rotary drive to axles 30 and 40. A symmetrical cross section may be preferable to simplify user insertion of the axle into drive socket 73.

Axle ends 86 and 88 may be conical, tapered, ball shaped, frustum conical, or other leading end decreased shaped to help in engaging into drive socket 73 or engaging into hole 90 in bearing 66. A dulled end helps in preventing injuries to users. Unlike other spit assemblies, the ends need not be sharpened to pierce foods.

Axle 30 and 64 may be of different lengths to give more flexibility in mounting spit assembly 20 into different sized and shaped barbeques. This may be a substantial advantage in marketing the preferred embodiment to both new and existing barbeque owners.

Figure 1:
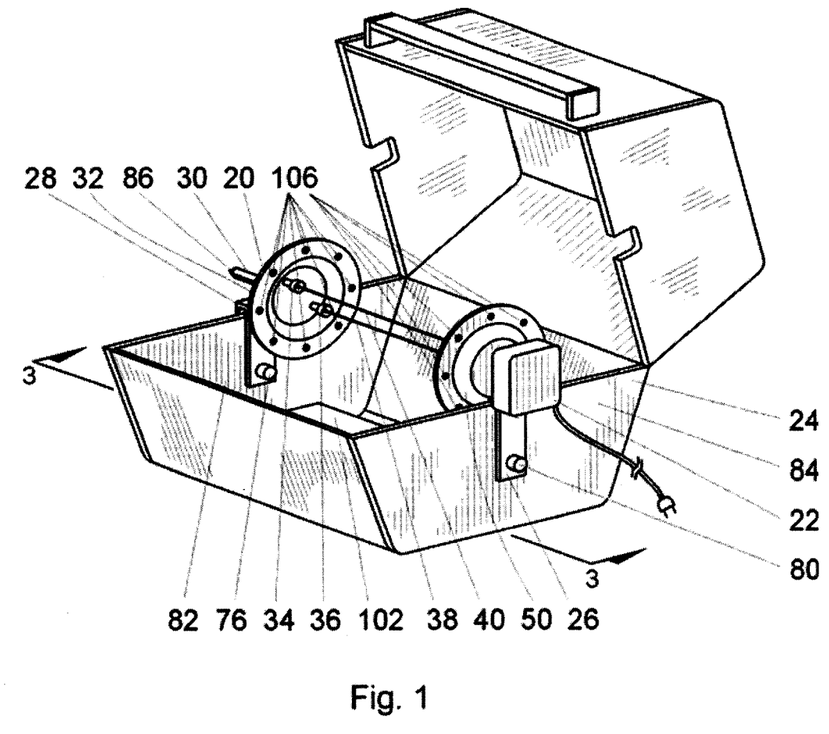
FIG. 1 is a perspective view of a preferred embodiment of the present inventions attached to a barbeque.
Figure 2:
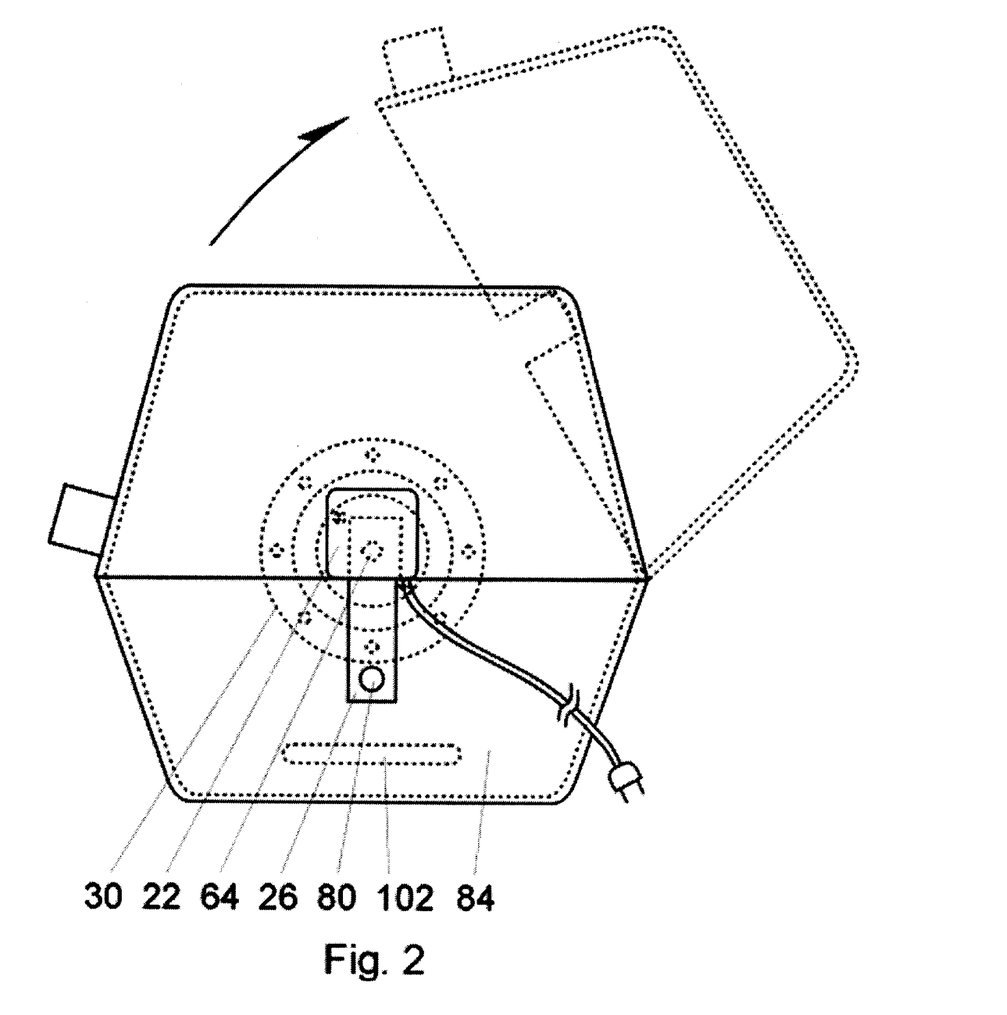
FIG. 2 is a right end view of the preferred embodiment illustrated in FIG. 1.
Figure 3:
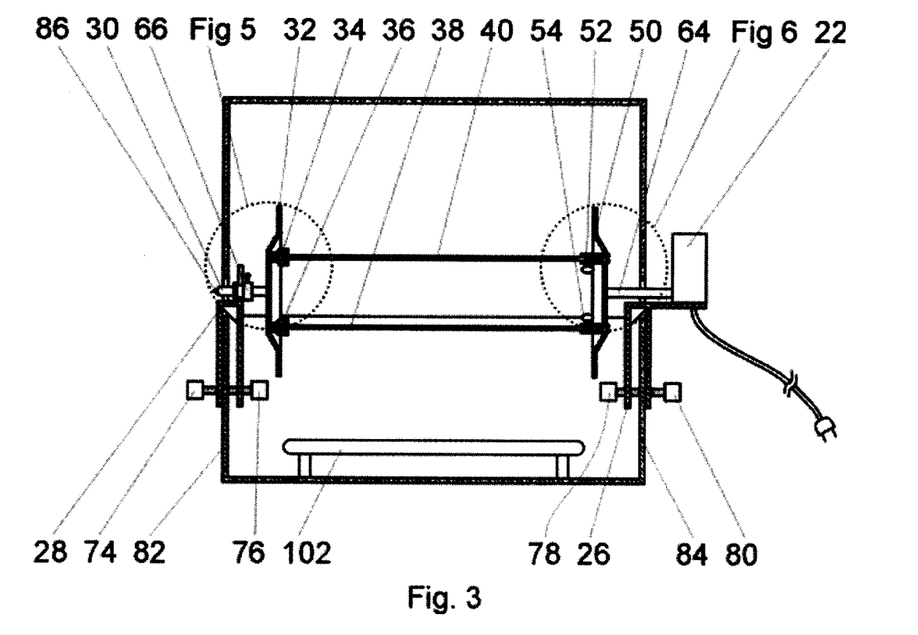
FIG. 3 is a section view taken through FIG. 1 as indicated in FIG. 1.

First, second, third and fourth clamping screws 74, 76, 78 and 80 secure and align mounting brackets 26 and 28 to side walls 84 and 82 of barbeque 20 (FIGS. 1 and 3). This mounting may be mirror imaged if advantageous for the individual barbeque or circumstance, such as, but not limited to, left handed users.

First spit tip receptacle 34 and second spit tip receptacle 36 may have first and second receptacle openings 90 and 92 respectively which first engage and guide sharpened cylindrical ends 42 and 44 into first and second tubular detents 37 and 39.

It is advantageous for receptacle outer openings 90 and 92 to be two-and-one-half times or more the thickness of the cross sections of first and second spit rods 38 and 40 to reduce the aiming and alignment required to engage first and second spit rods 38 and 40 into first and second spit tip receptacles 34 and 36. This is particularly advantageous because of having to engage two spit rods into two separate receptacles.

Inner perimeter circular walls 93 and 95 may also substantially help in simplifying catching and guiding sharpened cylindrical ends 42 and 44 into detents 37 and 39 as may the conical shape at the base of inner circular walls 93 and 95.

First and second spit rods 38 and 40 have the same size and shape of cross section to allow them to be interchangeably connected to receptacles 34 and 36. This may simplify assembly greatly. Also, first and second spit rods 38 and 40 may be symmetrical end to end allowing greater ease of use due to total interchangeability between spit rods, and ends of spit rods attached to either support plate.

An example of embodiment use is as follows. If the unit is packed unassembled, the user unpacks all components and attaches mounting brackets 26 and 28 to the upper center of barbeque side walls 84 and 82. Brackets 26 and 28 are then aligned to vertical and secured in the upper center of each side wall by hand adjusting and tightening clamping screws 74, 76, 78 and 80. As an example, clamping screws 74, 76, 78 and 80 are screwed in and out until both bracket 26 and 28 are both vertical and held tight.

Figure 7:
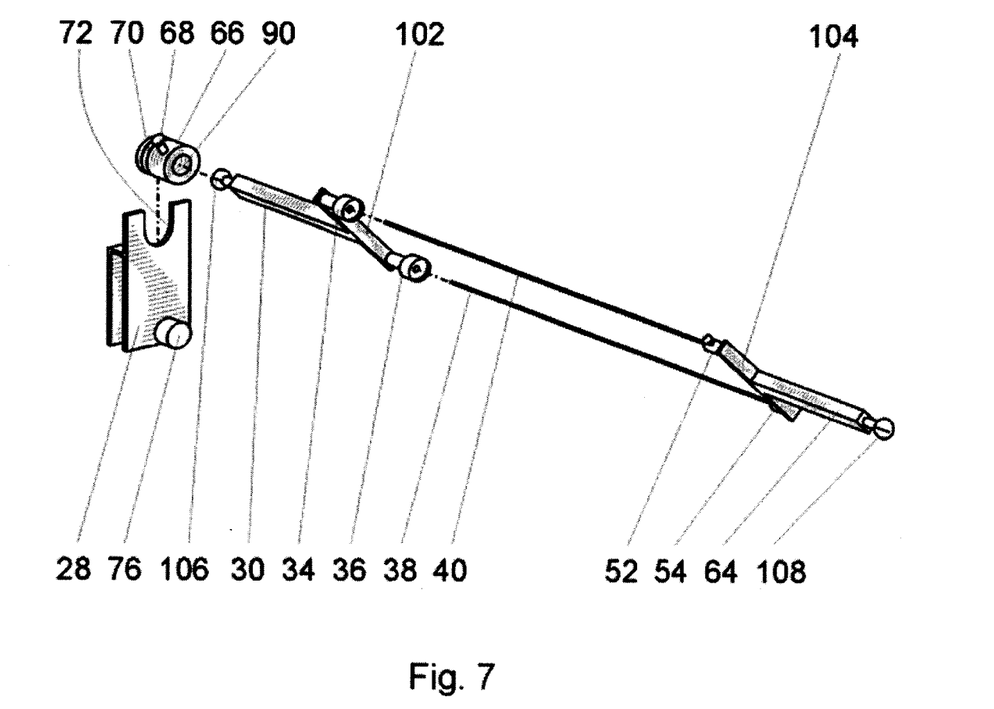
FIG. 7 is an exploded perspective view of an alternative preferred embodiment.

A first alternative to this is illustrated in FIG. 7 and may be adapted to a variety of embodiments of these inventions including all shown herein. Ends 106 and 108 of axles 30 and 64 may be adapted to be ball shaped in profile and the cross section of axles 30 and 64 in end view. This is similar to ball hex wrenches. In this alternative motor drive 22 need not be vertically or horizontally aligned but may be attached off alignment with the axis of spit assembly 20. This may simplify the construction of mounting bracket 26.

Likewise slot 70 in bearing 66 may be widened to two or three or more times the thickness of bracket 28 at U shaped notch 72 to allow bracket 28 to be mounted out of alignment with the axis of spit assembly 20.

In a second alternative, with appropriate modifications, existing rotisserie mounting brackets on the barbeque may be used to mount both motor drive 22 and bearing 66. Yet another alternative is to make axles 30 and 64 with a cross section which fits into existing spit motor drives and then mounting spit assembly 20 into the existing motor drive and existing rotisserie mounting brackets.

Next, first and second spit rods 38 and 40 are then attached to second support plate 50 by inserting them into third and fourth receptacles 52 and 54 and hand tightening first and second set screws 56 and 58. First, second, third and fourth notches 94, 96, 98 and 100 may align with first and second set screws 56 and 58 to help secure spit rods 38 and 40 to second support plate 50.

Food is then mounted to spit assembly 20. This may be done through use of mounting implements such as baskets described in U.S. Pat. No. 6,173,645, or may be done by other means, or it may be done directly by piercing the food with sharpened cylindrical ends 42 and 44 and sliding the food onto spit rods 38 and 40. The food may be mounted to a single rod or using both rods in combination. It may thus be advantageous to form spit rods 38 and 40 with a triangular, elongated rectangular, square or other non-circular cross section to help stabilize foods when they are mounted to a single spit rod. Or, as illustrated, a circular cross section may be used.

Bearing 66 is then slid over either axle 30 or 64 and third set screw 68 is hand tightened when bearing 66 is in the proper location to engage slot 70 into U shaped notch 72 when the axle at the opposite end of spit assembly 20 is engaged into rotary drive socket 73.

The axle not mounting bearing 66 is then engaged into rotary drive socket 73 and bearing 66 is lowered onto U shaped notch 72 where it engages slot 70. Heat source 102 is then activated along with motor drive 22 and the food is rotisserie cooked.

Various heat and motor drive settings may be used to cook and cool the food, from no rotation to rotation speeds exceeding 11 rpm, and from no heat to high heat, as an example for steaks and meat. Likewise heat may be cycled up and down to help in cooking foods to desired taste, appearance and texture. And the motor drive may cycle from fast to stop, as an example, full stop for searing meats.

The embodiment may be disassembled for storage, shipping or other reasons, as an example by reversing the above described assembly process. This is particularly advantageous for this embodiment as its twin spit rod, two support plate design is not innately space efficient for storage, or shipment or other purposes.

Many variations of this design and its use may be easily envisioned by one knowledgeable in the art after reading U.S. Pat. No. 6,173,645 ('645 herein) and hence are incorporated in this document by reference. Teachings in the '645 patent have been herein modified to describe an embodiment which is adapted to mounting on existing barbeques.

As an example, kabob rods, either non-moving or self turning may be mounted in holes 106. Other geometries of these holes, including but not limited to irregular or slot or notch shaped holes, may be used in substitution of illustrated holes 106.

An alternative preferred embodiment is shown in FIG. 7 with bar or rod shaped members 102 and 104 substituting for first and second support plates 32 and 50. Other similar elements to the first preferred embodiment are numbered according to the numbering identification used for the first preferred embodiment.

The second preferred embodiment may innately store and ship flat in a compact space, and may require much less material, and thus less cost, to fabricate.

The dual spit rod 38 and 40 design, when compared to conventional single spit rod designs, makes it easier to mount food onto the spit, and insures that the foods, once mounted, will rotate in unison with spit assembly 20 without more complex and difficult to use additional mounting hardware such as clamped-on spit forks. This design also allows the two spit rods 38 and 40 to each be thinner than a single rod due to having two spit rods as opposed to one support the food weight and torquing forces. This in turn means that the rods may be easier to clean and may more easily pierce the food to be cooked. Spit rods 38 and 40 also may be non-stick coated to make cleaning still easier and aid in inserting foods onto and removing foods from the rods.

Foods may also be mounted more off-center on two spit rods when contrasted with a single spit rod. This is due to greater torquing leverage of the two rod design. This in turn may allow more food to be mounted to the rods by allowing the counter-balanced mounting of several pieces of food.

Removing food from the two spit rods is accomplished by lifting the bearing end of spit assembly 20 and sliding the opposite end away from engagement with rotary drive socket 73. After support plate 32 is removed from spit rods 38 and 40, the food is then slid off the spit rods. This too may be easier than using a single spit rod because the two thin spit rods 38 and 40 may slide easier from the food than a single heavy rod, and because there are no spit forks or other hardware which must be removed to dismount the food.

Cleaning may be done easier than on other spit designs because the support plates 32 and 50 block splattering grease and oil from hitting the barbeque side walls, and because the plates 32 and 50 are removable and may be placed in a sink or dishwasher for easy cleaning. Cleaning ease may also enhanced by spit rods 38 and 40 being generally thinner than their single spit rod counter parts and, if used, the use of non-stick coating on the spit rods.

The embodiment may be made as a kit to fit many different barbeque designs. Such a kit could be independently sold from the barbeques that the kit might be mounted on. Included in such a kit might be, as an example, different length spit rods or a pair of spit rods that might be shortened to fit any specific barbeque. Either arrangement would allow the kit to adapt to different width barbeques.

Such a kit might include other items such as brushes for applying barbeque sauce or baskets to hold smaller foods for rotisserie cooking.

What have been described herein are alternative embodiments of the present inventions. Many changes to and variations of these embodiments will be obvious to one knowledgeable in the art. As examples: embodiments may be constructed using one, or more than two spit rods using the same construction details as shown herein for twin spit rods, embodiments may be constructed at larger or smaller scale than those described such as for commercial applications or for use in very small kitchens; embodiments may be constructed from different materials including steel, chrome plated steel, stainless steel, aluminum, other metals, plastic etc.; embodiments may have different coupling to the motor drive such as a socket on the spit assembly engaging a protrusion from the motor drive; support plates 32 and 50 might be elliptical, bar shaped, rectangular, square etc.; a ball or sleeve or other type of bearing might replace bearing 66; food holding baskets might mount directly to support plates 32 and 50; mounting brackets 26 and 28 might attach to barbeque 24 using screws, clamps, welding, or other means; heat source 102 might be charcoal, gas, electric or other type of heat source and might be positioned above, below or to one side of spit assembly 20; spit rods 38 and 40 might be stainless steel, steel, aluminum, plastic, non-stick coated material, composite, etc.; spit rods 38 and 40 might be secured on either or both ends using a screw thread, clamps, sockets that do not have the same cross section as spit rods 38 and 40; etc.

Such changes and modifications to the embodiments described herein are obvious and thus should be considered within the scope of the present inventions. The scope of protection afforded these inventions shall thus be limited by the appended claims and their legal equivalents.

What is claimed is:

1. A spit assembly to be fitted to a variety of barbeques comprising:

a plurality of spit rods;

a first linking member connected to a first end of each of the plurality of spit rods;

a first axle projecting from the first linking member in a direction generally opposite the projecting plurality of spit rods;

a plurality of receptacles each receiving in an overlapping fit and coupling, solely through the overlapping fit;

a second end of each of the plurality of spit rods;

a second linking member coupled to each of the plurality of receptacles;

a second axle projecting from the second linking member in a direction generally opposite the plurality of receptacles;

a bearing joined to, and adjustable along a portion of the length of one of the axles;

the bearing being removably linked to a bracket which is attached to a barbeque;

a rotary power source;

the rotary power source also being attached to the barbeque;

the rotary power source having a detachable coupling which links the rotary power source to the axle not linked to the bearing, and through the detachable coupling providing rotary drive to the plurality of spit rods; and the first linking member being coupled to the second linking member solely through the plurality of spit rods.

2. The spit assembly of claim 1 where the first linking member connects to the plurality of spit rods by a plurality of secondary receptacles attached to the first linking member each accepting a second end of one of the plurality of spit rods in an overlapping fit, and a set screw on each of the secondary receptacles tightening against each inserted spit rod second end.

3. The spit assembly of claim 2 where each set screw has a finger grip to hand tighten and loosen the set screw without use of tools.

4. An improved spit assembly for a barbeque comprising:

a first and a second essentially horizontal spit rod;

a first linking member connected to a first end of the first spit rod, and to a first end of the second spit rod;

a first axle projecting from the first linking member in a direction generally away from the connected first and second spit rods;

a first cavity shaped receptacle and a second cavity shaped receptacle;

the first cavity shaped receptacle accepting in a overlapping fit a second end of the first spit rod simultaneously with the second cavity shaped receptacle accepting in an overlapping fit a second end of the second spit rod;

a second linking member coupled to both the first cavity shaped receptacle and the second cavity shaped receptacle;

a second axle projecting from the second linking member in a direction generally away from the coupled first and second cavity shaped receptacles;

a bearing joined to, and adjustable along a portion of the length of, one of the axles, the bearing being removably linked to a bracket which is attached to a barbeque;

a rotary power source;

the rotary power source also being attached to the barbeque;

the rotary power source having a detachable coupling which links the rotary power source to the axle not joining the bearing and through the coupling providing rotary drive to: the first axle.

5. The spit assembly of claim 4 where the first linking member connects to the first spit rod by a third cavity shaped receptacle attached to the first linking member and overlapping the second end of the first spit rod, and the third cavity shaped receptacle having a set screw tightened against the second end of the first spit rod, and where the first spit rod can be removed from the third cavity shaped receptacle by loosening the set screw and pulling the first spit rod out of the third cavity shaped receptacle.

6. The spit assembly of claim 5 where the set screw has a finger grip to hand tighten and loosen the set screw without use of tools.

7. The spit assembly of claim 6 where the first end of the first spit rod comes to a point and the first spit rod is indented with a notch adjacent to the point and the hand tightened set screw tightens into the notch.

8. The spit assembly of claim 6 where the set screw generally points toward the axis of rotation of the first axle.

9. The spit assembly of claim 4 where the first linking member is connected to the second linking member solely through the first and second spit rods.

10. The spit assembly of claim 4 where the first axle, the first linking member, the first and second spit rods, the first and second cavity shaped receptacles, the second linking member, the second axle and the bearing are sold together as part of a kit to be used with existing barbeques.

11. The spit assembly of claim 4 where the first linking member is plate shaped.

12. The spit assembly of claim 11 where the plate shaped linking member has mounts for kabob rods.

13. The spit assembly of claim 11 where the second linking member is plate shaped.

14. The spit assembly of claim 4 where the bearing is joined to one of the axles by a set screw having a finger grip for hand tightening the set screw against the axle.

15. The spit assembly of claim 4 where the first cavity shaped receptacle has an outer opening accepting the second end of the first spit rod, and the outer opening is at least two-and-one-half times the thickness of the cross section of the first spit rod.

16. The spit assembly of claim 15 where the outer opening is surrounded by a perimeter wall.

17. The spit assembly of claim 4 where the first spit rod is symmetrical end to end.

18. The spit assembly of claim 4 where the first and second spit rods are interchangeable.

19. The spit assembly of claim 4 where both the first and second axles have the same cross sections.

20. The spit assembly of claim 19 where the cross section of both the first and second axles is square.

21. The spit assembly of claim 4 where the first axle is a different length than the second axle.

22. A spit assembly to fit a variety of barbeques, the assembly comprising:

a first axle and a first spit rod, and the first spit rod having both a first and a second end, and the first end of the first spit rod being rigidly coupled to the first axle;

a first receptacle and the first receptacle coupling to the second end of the first spit rod solely by an overlapping fit which is rigid;

a second axle;

the second axle being rigidly coupled to the first receptacle;

a bearing, and the bearing able to travel along the length of a portion of one of the axles and able to be secured at a point on the portion traversed;

a mounting bracket secured to a barbeque, and the mounting bracket being detachably coupled to the bearing; and a rotational drive mounted to the barbeque and the rotational drive being detachably coupled to the axle not securing the bearing and through such coupling supplying rotational drive to the first spit rod.

23. The spit assembly of claim 22 wherein there is a second spit rod which is disposed essentially parallel to the first spit rod and the second spit rod is rigidly coupled to the first axle and is detachably coupled through a rigid connector to the second axle.

24. The spit assembly of claim 22 wherein the first end of the first spit rod is rigidly couple to the first axle through an overlapping coupler secured by a set screw.

25. The spit assembly of claim 24 wherein the set screw has a finger grip allowing it to be loosened without use of tools.

26. The spit assembly of claim 22 wherein the rotation drive is detachably secured through an overlapping fit to the axle not securing the bearing.

27. The spit assembly of claim 22 wherein the bearing may be mounted to either the first or the second axle.

* * * * *